(12) United States Patent
Braford, Jr.

(10) Patent No.: US 6,209,695 B1
(45) Date of Patent: Apr. 3, 2001

(54) MULTI-SPEED TRANSMISSION WITH NO LAG ELECTRONICALLY CONTROLLED VALVING

(75) Inventor: Thomas E. Braford, Jr., Brighton, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/379,402

(22) Filed: Aug. 24, 1999

(51) Int. Cl.[7] .................................. F16D 25/0638
(52) U.S. Cl. ........................ 192/3.58; 192/85 AA; 475/116
(58) Field of Search ..................... 475/146, 116; 74/335; 192/85 AA, 3.58, 70.11, 87.11

(56) References Cited

U.S. PATENT DOCUMENTS

| | | | |
|---|---|---|---|
| 3,138,972 | * 6/1964 | Murgue et al. | 475/116 X |
| 4,147,245 | * 4/1979 | Folomin et al. | 192/85 AA |
| 4,750,384 | * 6/1988 | Belliveau | 475/146 |
| 5,437,355 | * 8/1995 | Takagi et al. | 192/85 AA X |
| 5,885,180 | * 3/1999 | Antonov | 475/116 |

* cited by examiner

Primary Examiner—Charles A. Marmor
Assistant Examiner—Ankur Parekh
(74) Attorney, Agent, or Firm—Reising, Ethington, Barnes, Kisselle et al.; Greg Dziegielewski

(57) ABSTRACT

An electronically controlled transmission has microprocessor and a clutch housing including an integrated solenoid controlled valve; the clutch housing including a valve track operatively receiving a valve element connected for operation by the integrated solenoid controlled valve; and a friction disc pack within the clutch housing having a piston actuator pressurized by fluid flow regulated by operation of the integrated solenoid controlled valve in response to electronic control signals from the microprocessor.

6 Claims, 1 Drawing Sheet

MULTI-SPEED TRANSMISSION WITH NO LAG ELECTRONICALLY CONTROLLED VALVING

BACKGROUND OF THE INVENTION

1. Field of the Invention

The present invention relates to electronically controlled transmissions and more particularly to such transmissions having a plurality of solenoid valves grouped as a unit.

2. Description of the Prior Art

Automatic transmissions for use in vehicular applications are known in which multiple forward ratios from 3 to 5 speeds at the present time. Such systems can be mechanical and hydraulic controls that are load responsive to perform the drive and gear ratio selection. Such systems include one way clutches and various planetary gear sets along with clutches and brakes that are operated in response to the operation of grouped servo valves to execute shifts without interrupting the power flow from a power source to drive wheels of the vehicle.

In order to further improve transmission performance electronic transmission controls have been developed that combine electronic processing of vehicle operation to establish output signals to selectively energize the various solenoid valves to control the gear selection and for adapting the pressures within the transmission in accordance with the torque flow of the drive train. Examples of such transmissions are set-forth in U.S. Pat. No. 4,750,384.

It has been proposed that such electronically controlled transmissions have their solenoid valves operated so that the clutch apply and release sequences can be programmed in a manner to eliminate the need for one way clutch devices for smoothing gear shifts in the transmission.

Theoretically, such electronic controls appear to be able to produce shift smoothing without one-way clutches. In practice this has not been the experience of transmission designers.

The reason for a difference between theory and practice is in part due to the fact that the solenoid controlled valves are grouped in a valve housing on one part of the outer case of the transmission.

In such arrangements each of the solenoid valves that are grouped in one location on the transmission must be separately calibrated against a master. Likewise, the various clutch and brake units within the transmission must be separately calibrated. Once the clutches/brakes are assembled within a clutch housings it in turn is assembled within an outer transmission case that includes suitable internal flow patterns to connect the operating pistons of the clutch/brakes to one or more individual valves in a grouped valve arrangement thereon including the separately calibrated solenoid operated control valves.

Once assembled, variations in the separately calibrated components can produce unexpected lag between apply and release control steps at the clutch/brake components and as a consequence gear shift performance can be adversely affected.

It is known to provide a single solenoid controller for a clutch pack as set-forth in U.S. Pat. No. 4,750,384. However, in this arrangement the solenoid controller is mounted on the outer case of the transmission and the clutch pack is in a separate clutch housing. There is no suggestion that the solenoid controller be directly integrated within the clutch housing so that the clutch housing and solenoid controller can be calibrated as a single unit prior to assembly such that the operation thereof can be precisely determined prior to assembly.

Another problem with such arrangements is that the grouped solenoid operated control valves are located in a valve housing at a single location on the outer case of a transmission. This results in different length hydraulic flow paths to actuators located at radially and axially spaced locations with respect to a common centerline through the transmission. The pressure losses in such paths further add to the difficulty in properly calibrating the fluid and mechanical components of a transmission so as to be suitable for accurate electronic control without performance lag.

As a consequence the ability to affect various smoothing controls is limited not by the monitoring and electronic processing but rather by lags caused by differences in the imposition of pressure changes due to inadequate calibration.

SUMMARY OF THE INVENTION

The present invention includes the integration of solenoid controlled valves and clutch housings for use in automatic electronically controlled multi-speed transmissions so that they can be calibrated as a unit so as to improve friction disc pack response to electronic control signals in an electronic transmission control.

An object is to provide for such integration in a configuration that will reduce lag between solenoid controlled valve operation and imposition of hydraulic pressure on the actuator for a friction disc pack.

A further object is to provide for such integration by including the solenoid controlled valve within a drop in housing for a friction disc pack for controlling gear sets within an automatic transmission.

A feature of the invention is to provide such reduced lag arrangements wherein the transmission has a clutch housing for gear ratio control clutch or brake of the type having a friction disc pack. Such packs have a first plurality of discs connected to a first transmission component and a second plurality of disc connected to a second transmission component. A solenoid-controlled valve and valve tracking are directly integrated into the clutch housing and the solenoid-controlled valve is responsive to an output signal from a high-speed microprocessor. The valve tracking communicates a pressurized inlet plenum within the clutch housing to a piston for actuating the friction disc pack in a manner that reduces the hydraulic lag time so as to improve the response of the clutches to pressure changes directed thereto.

DESCRIPTION OF THE PREFERRED EMBODIMENT

Figure 2:
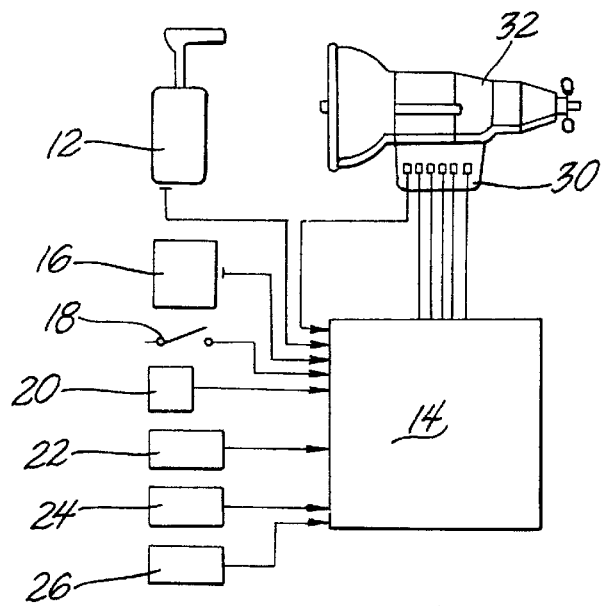
FIG. 2 is a diagrammatic view of a prior art multi-speed electronically controlled transmission.

FIG. 2 shows a electron transmission control 10 of the prior art including a selector lever and position switch 12 and a microprocessor 14 that receives a position switch signal from the selector lever and position switch 12. Other monitors including a program switch 16; kick down switch 18 throttle valve angle sensor 20; output rpm sensor 22; engine torque 24 and engine rpm 26; all of which direct input signals to the microprocessor 14 for processing in a known manner and wherein the microprocessor 14 is programmed in a known manner to produce output signals for selectively actuating a plurality of solenoid controlled valves 30 that are grouped at one location on the underside of a transmission housing 32.

In the past the fluid pressure from a pump is directed through valves in the grouped solenoid controlled valves and then through a passage or external line to a point of use.

Figure 1:
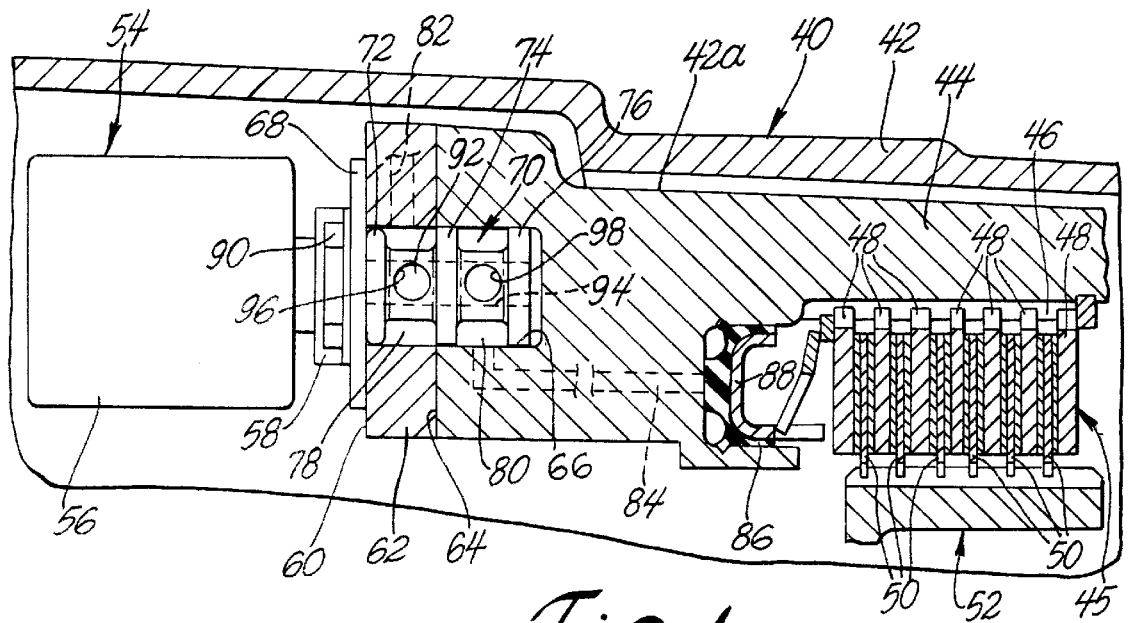
FIG. 1 is a fragmentary sectional view of an integrated clutch housing and solenoid controlled valve of the present invention.

As shown in FIG. 1, the transmission 40 of the present invention includes a plurality of friction couplings that are operated by a piston when a pressurized fluid is directed there against. One such friction coupling is shown in FIG. 2. In order to avoid the lag problem of the prior art, the transmission 40 includes an outer case 42 and one or more drop in brake or clutch housings 44 for one or more friction disc packs 45.

In the illustrated arrangement the drop in housing 44 has a splined inner surface 46 that is connected to externally splined plates 48. The plates 48 are interleaved with internally splined friction discs 50, 56 coupled to a hub portion 52 of a gear shift gear set (not shown) of a known type.

The drop in housing 44 is secured with respect to the outer case 42 by being slidably engaged with an internal rib 42a on the interior surface thereof.

In accordance with the invention the drop in housing 44 is integrated with a solenoid controlled valve assembly 54. A solenoid coil housing 56 is connected by a bracket 58 to the outer end 60 of the housing 44. In this embodiment, the outer end 60 is formed on an annular cover 62 closing a brake housing surface 64 that can have a plurality of suitable passages therein for feeding one or more brake units if desired.

The cover 62 and housing 44 have a valve track bore 66 formed therethrough. The bore 66 has a suitable seal gland 68 at the outboard end thereof. It receives a valve track 70 therein with spaced shoulders 72, 74, 76 sealed against the bore 66 to form annular cavities 78 and 80. The housing 44 includes an inlet passage 82 connected to a source of pressurized actuating fluid directed to cavity 78. The cavity 80 connects to an outlet passage 84 in the housing 44 that is communicated with a piston bore 86 therein. The piston bore 86 receives an actuating piston 88 that will be acted upon by pressure from the inlet 88 to engage the friction disc pack 45. When the actuation pressure is connected to an exhaust 90 in the controller 54 the piston 88 is biased by a return spring 92 so as to disengage the plates 48 and friction discs 50 of the pack 45. The control of pressurized fluid within the controller 54 is by a valve element 92 of a known type with suitable lands thereon that seal against an internal bore 94 to control flow between the inlet passage 82, the outlet passage 84 and the exhaust 90 via openings 96, 98 in the valve track 70 and as is known by those skilled in the prior art.

The solenoid operated control valve 54 is connected to a high speed microprocessor and because it is directly integrated on the housing 44 can be calibrated to accurately process outputs from such a microprocessor to produce a no lag response to brake engagement and release to produce a desired control of an associated gear set.

The solenoid operated control valve 54 will respond to output signals to shift the valve element 92 connected thereto within the valve track 70 such that pressurized flow from the transmission pump will be directly applied to the brakes such that the speed range of the multi-speed gear set can be adjusted smoothly in response to a variety of desired operating programs.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. An electronically controlled transmission having a microprocessor; a transmission case and a solenoid controlled valve operated by signals from the microprocessor characterized by:

a friction coupling housing including an integrated solenoid controlled valve; said friction coupling housing including a valve track operably receiving a valve element connected for operation by said integrated solenoid controlled valve; a friction disc pack within said friction coupling housing; and a piston actuator within said friction coupling housing pressurized by fluid flow across said valve element in response to electronic control signals from the microprocessor.

2. The transmission of claim 1 wherein said friction coupling housing is a drop in housing secured to the inside of said transmission case.

3. The transmission of claim 2 wherein said drop-in housing includes a pressurizable inlet passage and an outlet passage therein configured to reduce hydraulic lag between solenoid controlled valve operation and imposition of hydraulic pressure on said piston actuator for the friction disc pack.

4. The transmission of claim 1 said microprocessor being a high-speed microprocessor.

5. The transmission of claim 1 wherein:

said friction disc pack is a gear-ratio control friction disc pack;

said friction coupling housing encloses said gear-ratio control friction disc pack; and said friction disc pack comprising a first plurality of discs non-rotatably connected to said friction coupling housing and a second plurality of discs non-rotatably connected to a transmission component.

6. The transmission of claim 1 wherein said solenoid controlled valve and said valve track are located axially of said friction disc pack and said friction coupling housing having a cover and said solenoid controlled valve directly integrated into said cover.

\* \* \* \* \*